United States Patent [19]

Honsa

[11] 4,444,435

[45] Apr. 24, 1984

[54] MOLDED WHEEL CENTER

[75] Inventor: Horst L. A. Honsa, Savannah, Tenn.

[73] Assignee: Sun Metal Products, Inc., Warsaw, Ind.

[21] Appl. No.: 357,905

[22] Filed: Mar. 15, 1982

[51] Int. Cl.³ .................. B60B 3/02; B60B 3/06; B60B 5/02

[52] U.S. Cl. .................. 301/63 PW; 301/65; D12/204

[58] Field of Search ............ 301/63 R, 63 C, 63 PW, 301/65, 66, 73, 79; D12/135, 204

[56] References Cited

U.S. PATENT DOCUMENTS

| D. 192,417 | 3/1962 | Hulterstrum | D12/135 |
| D. 221,833 | 9/1971 | Haydock | D12/204 X |
| D. 235,433 | 6/1975 | May et al. | D12/135 X |
| D. 239,619 | 4/1976 | May et al. | D12/204 |
| D. 256,452 | 8/1980 | Wolff | D12/204 |
| 1,454,249 | 5/1923 | Melanowski | 301/65 X |
| 1,491,560 | 4/1924 | Slick | D12/204 |

*Primary Examiner*—David A. Scherbel
*Attorney, Agent, or Firm*—John S. Fosse

[57] ABSTRACT

A wheel center comprises a cylindrical rim and a coaxial hub. Two sets of V-shaped spokes connect the rim and hub, a set of relatively axially outwardly disposed spokes being alternated with a set of relatively axially inwardly placed spokes. A triangularly-shaped, dihedral rib is inlet into each of the spokes, these ribs having an arcuate base connected with the rim and an apex disposed radially inwardly from the rim spaced apart from the hub to define a central stabilizing spoke panel.

3 Claims, 7 Drawing Figures

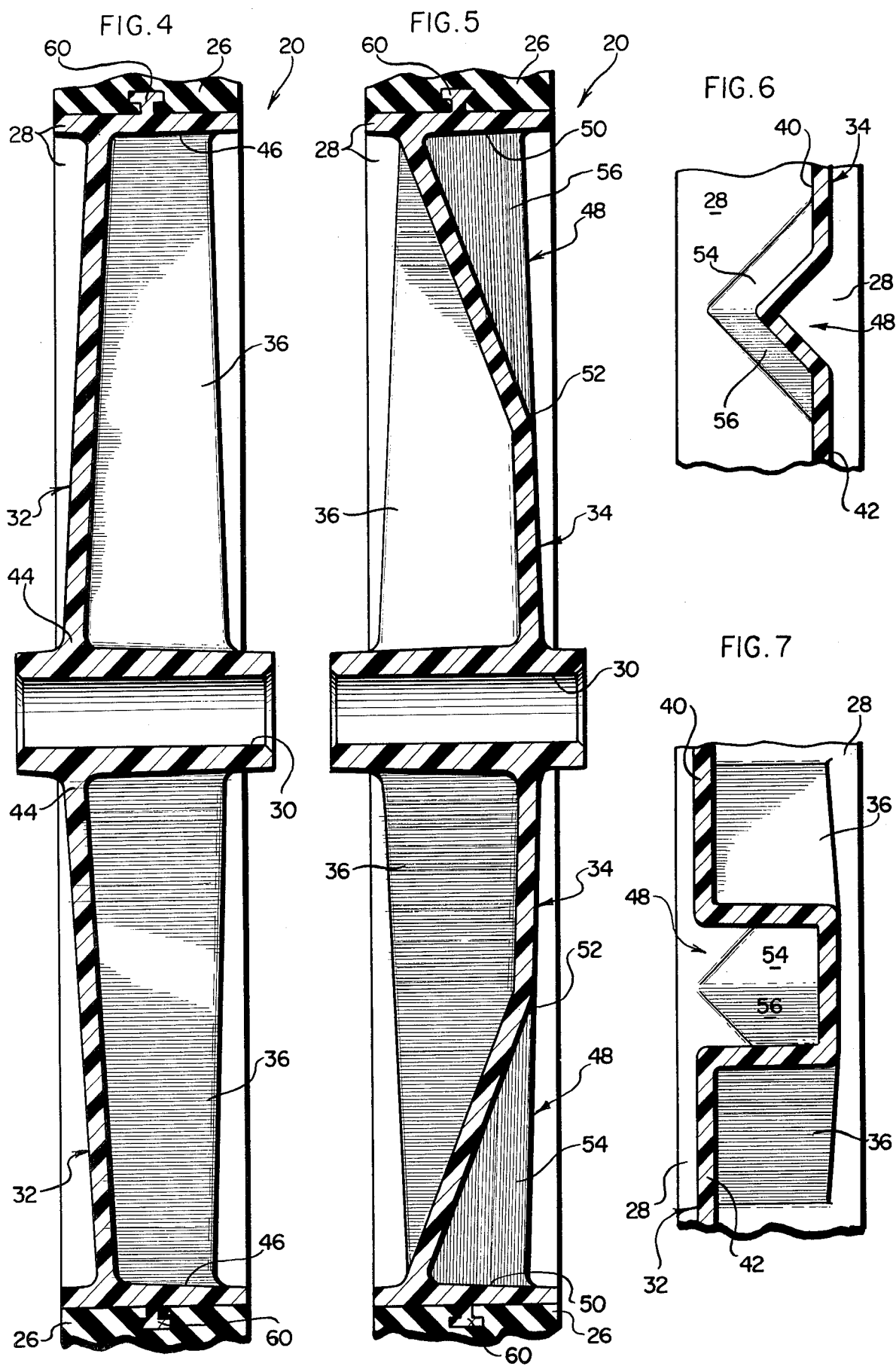

MOLDED WHEEL CENTER

FIELD OF THE INVENTION

This invention relates generally to vehicle wheels and more particularly to one-piece wheel discs or wheel centers that can be molded from a suitable engineering plastics material.

BACKGROUND OF THE INVENTION

Wheels of various sorts have been used in the past for rollable support of a wide variety of household and domestic vehicles and devices including garbage carts, lawn and garden equipment, shopping carts, golf carts, children's tricycles, and outboard training wheels for juvenile sidewalk bicycles. Wire-spoke wheels have proved eminently suitable in these applications, but the search for less expensive designs has lead to the introduction of wheel discs made of plastic. However, a common problem with prior art plastic wheel centers has been the comparative radial weakness of the most economical configurations. A related difficulty has resided in warpage of the wheel disc and rim and the resultant wobbly tracking that has been exhibited by those designs employing deep, hollow spokes for strength-enhancement. An example o the configurations that are subject to this undesirable warpage and wobbly tracking is shown in U.S. Pat. No. De-239,619.

SUMMARY OF THE INVENTION

The present invention overcomes the limitations of the prior art by arranging a wheel disc with altenately raised and depressed "hollow" spokes and by providing these spokes with V-shaped, dihedral rib sections which extend, importantly, only a fraction of the radial distance inwardly from the rim. The resulting structure has proved to be exceptionally strong, economical and easy to fabricate to stable geometry in a plastics injection molding operation.

Accordingly, a general object of the present invention. is to provide a new and improved one-piece wheel disc.

Another object of the invention is to provide a plastic wheel disc which is mechanically strong, runs true and is economical to manufacture.

These and other objects and features of the invention will become more apparent from a consideration of the following descriptions.

BRIEF DESCRIPTION OF THE DRAWINGS

The invention, both as to its construction and its mode of operation, will be better understood by reference to the following disclosure and drawings forming a part thereof wherein:

FIG. 4 is a view similar to the showing of FIG. 3 but taken substantially along the line 4—4 of FIG. 2 to show the generally planar configuration of the wheel spokes proper;

FIG. 5 is a view similar to the showing of FIGS. 3 and 4 but taken substantially along the line 5—5 of FIG. 2 to show the comparative depth of the abbreviated ribs which are inlet into the spokes of the wheel;

FIG. 6 is a view taken along the line 6—6 of FIG. 2 to illustrate the configuration of the triangular-shaped dihedral ribs; and FIG. 7 is a sectional view taken substantially along the line 7—7 of FIG. 2 to further illustrate the arrangement of the inlet ribs.

DETAILED DESCRIPTION OF THE INVENTION

Figure 1:
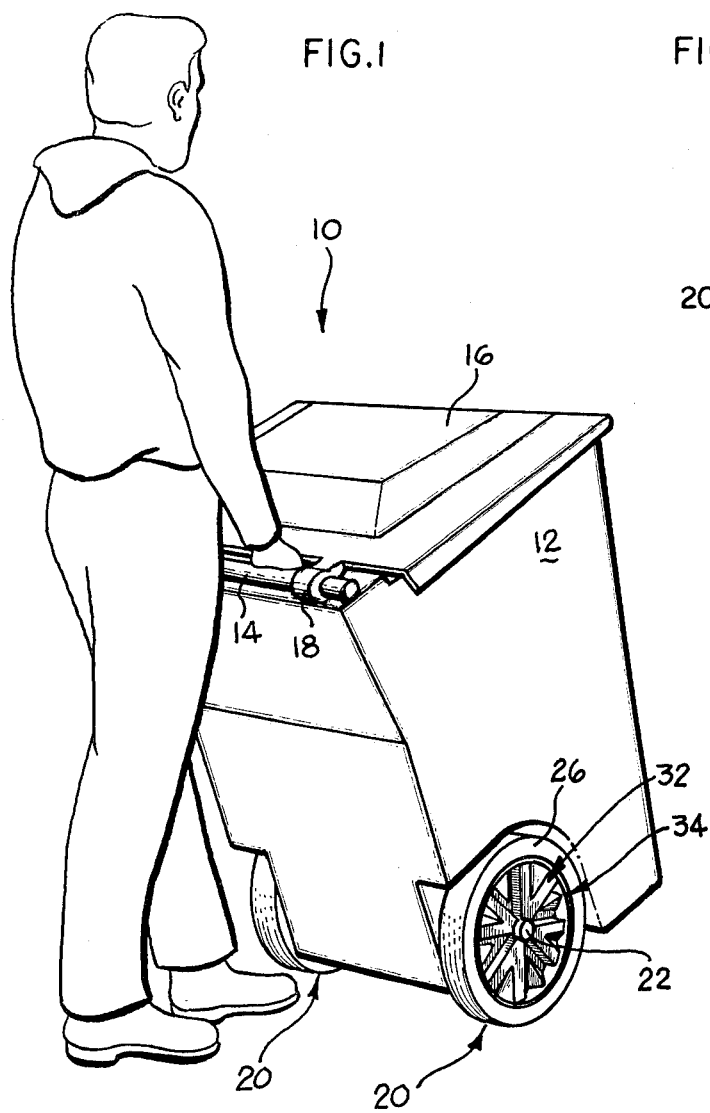
FIG. 1 is a perspective view of a garbage cart rollably supported on rubber-tired wheels that are constructed in compliance with the present invention.

Referring now in detail to the drawings and giving first attention to FIG. 1, a household garbage cart indicated generally by the reference numeral 10 comprises a molded body 12, a handle bar 14, a cover 16 pivoted on hinge means 18, and a rollable undercarriage which includes a pair of spaced apart, rubber-tired wheels 20 connected by an axle 22. The wheels 20 are constructed in compliance with the principles of the present invention; and their use in the garbage cart 10 is employed herein for purposes of illustration only.

Figure 3:
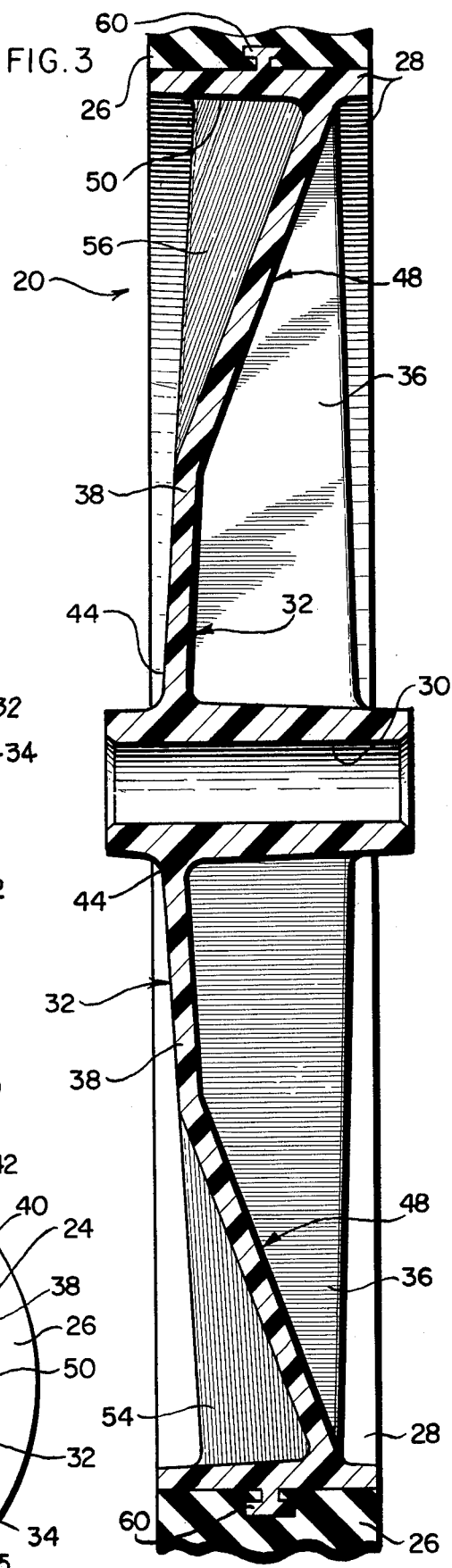
FIG. 3 is a further enlarged, sectional view taken substantially along the line 3—3 of FIG. 2.
Figure 2:
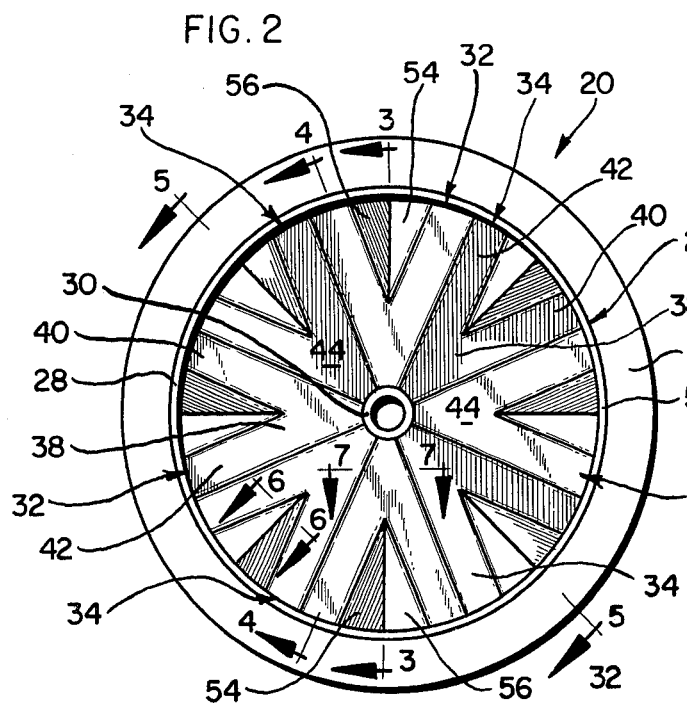
FIG. 2 is an enlarged side elevational view of one of the wheels used in the garbage cart arrangement of FIG. 1.

Turning to FIG. 2 and with supplemental reference to FIGS. 3-5, each wheel 20 includes a disc or center 24 and a tire 26 of the solid or semi-pneumatic variety. The wheel center 24 comprises a cylindrical rim 28; a tubular, axle-receiving hub 30 that is disposed in coaxial relationship with the rim 28; four relative axially outwardly disposed, equiangularly spaced, V-shaped spokes 32, and four relatively axially inwardly placed, equiangularly spaced, V-shaped spokes 34. The spokes 32 and 34 are arrayed in alternate arrangement; and as will be recognized, other numbers of spokes may be employed as desired. In addition, the spokes 34 and 32 are arbitrarily denominated herein as "inner" and "outer" in order to differentiate their relative axial spacing. Correspondingly, the hub and the rim may be considered as having "inner" and "outer" end portions and circular edges respectively.

The relatively axially inwardly disposed spokes 34 are connected to the axially outwardly disposed spokes 32 by radially extending wall elements 36; and each of the spokes 32 and 34 comprises, as is best seen in FIGS. 2 and 3, a center panel 38 and a pair of diverging side panels 40 and 42, the center panel 38 terminating inwardly in an apex 44 by which the spoke is connected to the hub 30. In addition, each of the spokes 32 and 34 includes an arcuate base 46 by which the spoke is connected to the rim 28. Although the spokes 32 and 34 are shown as being substantially planarly configurated, these elements may also be arranged to be dished or curved.

In compliance with the features of the present invention, each of the spokes 32 and 34 is inlet with a triangularly-shaped, dihedral rib 48, each rib 48 having an arcuate base 50 which is connected with the rim 28, and an apex 52 which is disposed radially inwardly from the rim 28 spaced apart from the hub 30 to define the central spoke panel 38. Desirably, the ribs extend radially inwardly from the rim by greater than one-half of the radial distance from the hub to the rim. So arranged, the ribs 48 cooperate with the central spoke panels 38 to stabilize the geometry of the wheel center or disc for resisting warpage and optimizing strength while permitting the wheel center to be made from a minimum amount of material and in relatively uniform cross-sections in order to facilitate injection molding.

Using the "inner" and "outer" nomenclature referred to hereinabove, the ribs inlet into the "inner" spokes 34 will have the intersection of their dihedral walls disposed adjacent the "outer" rim edge, and vice versa.

In further compliance with the present invention, each of the ribs 48 specifically includes a pair of surfaces or walls 54 and 56 which intersect to form the dihedral, preferably at an angle of about 90 degrees, all will be seen in FIGS. 6 and 7. It is also to be observed that the respective arcuate extents of the rib panels 54 and 56 and the spoke side panels 40 and 42, as measured at the rim 28, are substantially equal and trace a repeated, regular pattern at the rim. This arrangement of the ribs and spokes minimizes differential shrinkage of the rim on cooling of the part when it is released from the injection molding die, further minimizing warpage and insuring that the wheels 20 run true.

The rim is conveniently fashioned with radially outwardly projecting tongues 60 for use in locating the tire 26.

The drawings and the foregoing descriptions are not intended to represent the only forms of the invention in regard to its details of construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated in the following claims.

The invention is claimed as follows:

1. A wheel center comprising: a cylindrical rim having relatively axially inner and outer circular edges; a hub disposed coaxially with said rim, said hub having relatively axially inner and outer end portions corresponding generally with the inner and outer rim edges; a first plurality of V-shaped spokes disposed adjacent said inner rim edge and said inner hub end portion and extending from an apex connected with said hub to an arcuate base connected with said rim; a first triangularly-shaped, dihedral rib inlet into each of said first plurality of spokes, said rib having an arcuate base connected with said rim and an apex disposed radially inwardly from said rim spaced apart from said hub whereby to define a central stabilizing spoke panel, the intersection of the respective surfaces of said ribs being disposed adjacent said outer rim edge and a second plurality of V-shaped spokes alternately arranged interjacent said first-mentioned spokes spaced relatively axially apart therefrom; radial wall elements connecting adjacent edge portions of said alternating first and second pluralities of spokes; and a second triangularly-shaped, dihedral rib inlet into each of said second plurality of spokes, each of said last-mentioned ribs having an arcuate base connected with said rim and an apex disposed radially inwardly from said rim spaced apart from said hub to define a central stabilizing spoke panel, the intersection of the respective surfaces of said last-mentioned ribs being disposed adjacent said inner rim edge, each of said first dihedral ribs being arcuately separated from the adjacent second dihedral ribs by a first spoke panel, a portion of a said radial wall element, and a second spoke panel.

2. A wheel center according to claim 1 wherein the respective surfaces of each of said ribs subtend an angle of substantially 90 degrees.

3. A wheel center according to claim 1 wherein the radial extent of each of said ribs is greater than one-half of the radial distance from said hub to said rim.

* * * * *